US010614087B2

United States Patent
Cao et al.

(10) Patent No.: US 10,614,087 B2
(45) Date of Patent: Apr. 7, 2020

(54) DATA ANALYTICS ON DISTRIBUTED DATABASES

(71) Applicant: International Business Machines Corporation, Armonk, NY (US)

(72) Inventors: Zhao Cao, Beijing (CN); Jing Wang, Beijing (CN); Lanjun Wang, Beijing (CN); Li Wen, Beijing (CN); Yan Wu, Beijing (CN); Lin Hao Xu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 541 days.

(21) Appl. No.: 15/407,434

(22) Filed: Jan. 17, 2017

(65) Prior Publication Data

US 2018/0203912 A1    Jul. 19, 2018

(51) Int. Cl.
 *G06F 16/2458*    (2019.01)
(52) U.S. Cl.
 CPC ............... *G06F 16/2471* (2019.01)
(58) Field of Classification Search
 CPC .................. G06F 19/34; G06F 16/2471
 See application file for complete search history.

(56) References Cited

U.S. PATENT DOCUMENTS

| | | |
|---|---|---|
| 10,318,491 B1 * | 6/2019 | Graham ............... G06F 16/2465 |
| 2014/0279838 A1 | 9/2014 | Tsirogiannis et al. |
| 2014/0351233 A1 | 11/2014 | Crupi et al. |
| 2019/0163842 A1 * | 5/2019 | Pal ......................... G06F 16/211 |

* cited by examiner

*Primary Examiner* — Mariela Reyes
*Assistant Examiner* — Courtney Harmon
(74) *Attorney, Agent, or Firm* — Scully, Scott, Murphy & Presser, P.C.; Joseph Petrokaitis, Esq.

(57) ABSTRACT

Data analytics is performed on a distributed document storage database by receiving a request for initiating a data analytics job; collecting statistics from the database in response to the request; using the statistics to estimate a first cost for merging an incremental data update for the job into a first resilient distributed dataset; using the statistics to estimate a second cost for newly creating a second resilient distributed dataset for the job; when the first cost is less than the second cost, reading data updates from the database and merging the data updates into the first resilient distributed dataset; and when the first cost is not less than the second cost, newly creating the second resilient distributed dataset by reading all documents from the database.

16 Claims, 8 Drawing Sheets

DATA ANALYTICS ON DISTRIBUTED DATABASES

FIELD

The present application relates generally to data analytics and, more particularly, to performing data analytics on document storage devices using incremental data updates.

BACKGROUND

Data interchange is a method for exchanging computer-readable data between two or more autonomous computer systems or servers. These computer systems may use different operating systems. JavaScript™ Object Notation (JSON) is a lightweight data interchange format that uses human-readable text to store and transmit data objects comprising attribute-value pairs. One common use of JSON is to read data from a web server, and to display the data in a web page. JSON may be used as an alternative to XML (Extendible Markup Language) for organizing data. Likewise, JSON may be used in conjunction with distributed document storage databases. JSON documents are relatively lightweight and are executed rapidly on web servers.

JSON includes "name: object" pairs and punctuation in the form of brackets, parenthesis, colons, and semicolons. Each object is defined with an operator such as "text:" or "image:" and then grouped with a value for that operator. The simple structure and absence of mathematical notation and algorithms makes JSON intuitive, easy to understand, and quickly mastered, even by those with limited formal programming experience. Moreover, JSON facilitates the development of web and mobile applications while not being affected by database schema changes. A schema is an organizational structure that represents a logical view of a database. The schema defines how data is organized, specifies relationships among the data, and formulates all constraints that are to be applied to the data.

JSON distributed document storage databases do not always provide adequate data analysis capabilities. As a result, external data analytic services, such as Spark™, have been developed to integrate data analysis capabilities with JSON distributed document storage databases. In order to leverage data analytic services, documents in a JSON document storage database must be read and transformed into a Resilient Distributed Dataset (RDD), and then an analytics job may be executed on the RDD. The RDD is an immutable, fault-tolerant, distributed collection of objects that can be operated on in parallel. The RDD can contain any type of object and is created by loading an external dataset or distributing a collection from a driver program. RDD data is resilient, in the sense that the data can be recomputed in case all or a portion of the data is lost. RDD data is distributed, such that the data can be read and processed from any of multiple nodes without having to drag the data to any particular node. RDDs are computed in memory and can be persisted in memory. RDDs can be recomputed each time an action is executed, or an RDD may be persisted in memory, in which case elements of the RDD are retained on a cluster for much faster access the next time that the elements are queried. RDDs are advantageous in terms of rearranging computations to optimize data processing.

As a practical matter, many data analytics jobs are required to be executed at regular time intervals, or on a continual basis. When a first round of a data analytics job is executed, a first set of documents from the JSON distributed document storage database is analyzed. Then, when a second round of the data analytics job is to be executed, a second set of documents from the JSON distributed document storage database needs to be analyzed. In general, the second set of documents is not identical to the first set of documents. Since the documents to be analyzed are changing dynamically, this poses challenges in terms of effectively and efficiently supporting data analytics on JSON distributed document storage databases. Thus, there exists a need to overcome at least one of the preceding deficiencies and limitations of the related art.

SUMMARY

The following summary is merely intended to be exemplary. The summary is not intended to limit the scope of the claims.

A method for performing data analytics on a distributed document storage database, in one aspect, may comprise receiving a request for initiating a data analytics job; collecting a set of statistics from the distributed document storage database in response to the request; using the set of statistics to estimate a first cost for merging an incremental data update for the data analytics job into a first resilient distributed dataset; using the set of statistics to estimate a second cost for newly creating a second resilient distributed dataset for the data analytics job; comparing the first cost to the second cost and, when the first cost is less than the second cost, reading one or more data updates from the distributed document storage database and merging the one or more data updates into the first resilient distributed dataset; and when the first cost is not less than the second cost, newly creating the second resilient distributed dataset by reading all documents from the distributed document storage database.

A computer program product for performing data analytics on a distributed document storage database, in another aspect, may comprise a computer-readable storage medium having a computer-readable program stored therein, wherein the computer-readable program, when executed on a processor, causes the processor to receive a request for initiating a data analytics job; collect a set of statistics from the distributed document storage database in response to the request; use the set of statistics to estimate a first cost for merging an incremental data update for the data analytics job into a first resilient distributed dataset; use the set of statistics to estimate a second cost for newly creating a second resilient distributed dataset for the data analytics job; compare the first cost to the second cost and, when the first cost is less than the second cost, read one or more data updates from the distributed document storage database and merge the one or more data updates into the first resilient distributed dataset; and when the first cost is not less than the second cost, newly create the second resilient distributed dataset by reading all documents from the distributed document storage database.

An apparatus for performing data analytics on a distributed document storage database, in another aspect, may comprise a processor and a memory coupled to the processor, wherein the memory comprises instructions which, when executed by the processor, cause the processor to receive a request for initiating a data analytics job; collect a set of statistics from the distributed document storage database in response to the request; use the set of statistics to estimate a first cost for merging an incremental data update for the data analytics job into a first resilient distributed dataset; use the set of statistics to estimate a second cost for newly creating a second resilient distributed dataset for the data analytics job; compare the first cost to the second cost and, when the first cost is less than the second cost, read one or more data updates from the distributed document storage database and merge the one or more data updates into the first resilient distributed dataset; and when the first cost is not less than the second cost, newly create the second resilient distributed dataset by reading all documents from the distributed document storage database.

BRIEF DESCRIPTION OF THE SEVERAL VIEWS OF THE DRAWINGS

The foregoing aspects and other features are explained in the following description, taken in connection with the accompanying drawings, wherein.

DETAILED DESCRIPTION

Figure 1:
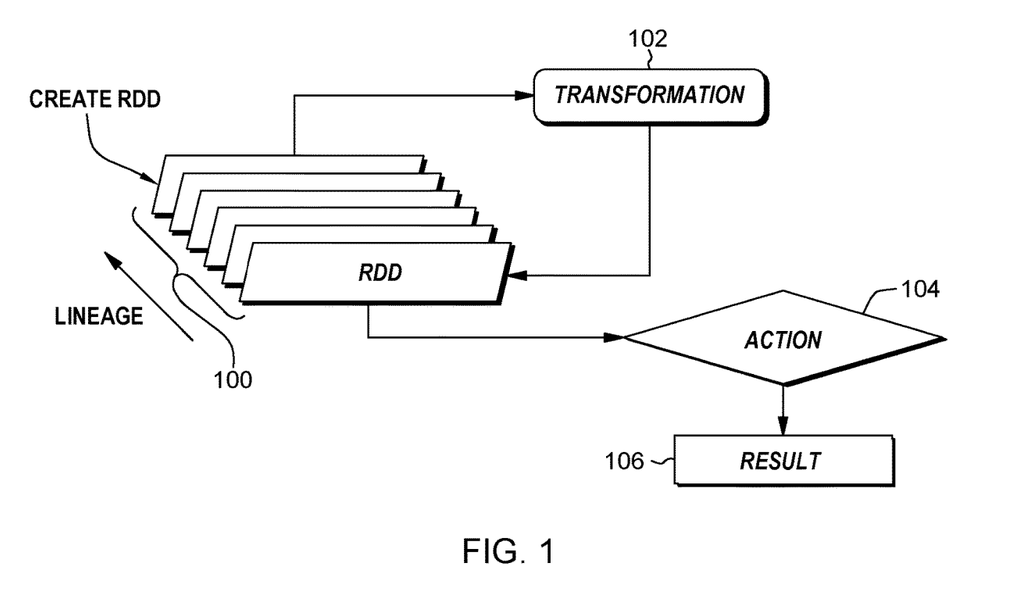
FIG. 1 illustrates a processing framework in accordance with one or more embodiments of the present invention.

FIG. 1 illustrates a processing framework in accordance with one or more embodiments of the present invention. For purposes of illustration, data analytics may be provided using an open-source data analytics framework such as Apache Spark™ Spark™ is described herein for illustrative purposes, as another type of data analytics framework may be used in lieu of, or in addition to, Spark™. Spark™ includes a core engine that functions as an application programming interface (API) layer. A set of resilient distributed datasets (RDDs) 100 are provided for implementing data analytics procedures. A set of related tools are provided for managing and analyzing data, including a Structured Query Language (SQL) engine, a library of machine learning algorithms (MLib), a graph processing system (GraphX), and streaming data processing software. Spark™ can process data from a variety of data repositories, including a Hadoop™ Distributed File System (HDFS), a Not Only Structured Query Language (NoSQL) database, or a relational data store such as Apache Hive™. Spark™ supports in-memory processing to boost the performance of big data analytics applications, but Spark™ can also perform conventional disk-based processing when data sets are too large to fit into available system memory.

The set of RDDs 100 is an abstract representation of data divided into partitions and distributed across a cluster. Each RDD in the set of RDDs 100 represents an immutable, partitioned collection of data elements that can be operated on in parallel. Each of the partitions may be stored in random-access memory (RAM), or on a data storage drive, or on any other type of computer-readable memory device.

Spark™ supports two basic categories of operations that may be performed on any RDD in the set of RDDs 100. These categories include transformations and actions. A transformation 102 is used to transform data in any RDD of the set of RDDs 100 from one form to another. Examples of transformations include operations such as map, filter, and flatMap. When the transformation 102 is applied to a first RDD of the set of RDDs 100, the transformation 102 is generally not performed immediately. Rather, a Directed Acyclic Graph (DAG) is created that incorporates the transformation 102, the first RDD, and a function used to implement the transformation 102. The transformation 102 may continue building the DAG by using zero or more additional RDDs of the set of RDDs 100, until an action 104 is applied to a last RDD of the additional RDDs. The action 104 triggers execution of all transformation 102 operations on the first RDD using the additional RDDs, or using the DAG. An end result 106 of the transformation 102 is a new RDD in the set of RDDs 100 that includes transformed data. After the transformation 102 operations are completed, the action 104 operation is executed on the last RDD.

One RDD of the set of RDDs 100 may be dependent upon zero, one, or more than one additional RDD of the set of RDDs 100. Due to the dependent nature of the set of RDDs 100, eventually the set of RDDs will create a single DAG from start to end. This property is referred to as lineage. Lineage is an important aspect for fault tolerant operation in Spark™. Execution of any operation in Spark™ is distributed to various nodes. When any node goes down, or an executing process on any node crashes, then Spark™ automatically reschedules the process to another suitable node and recovers the intermediate state of the failed node using this lineage. All operations are relaunched using lineage, and any intermediate data that may have been computed in the failed node is recomputed.

Figure 2:
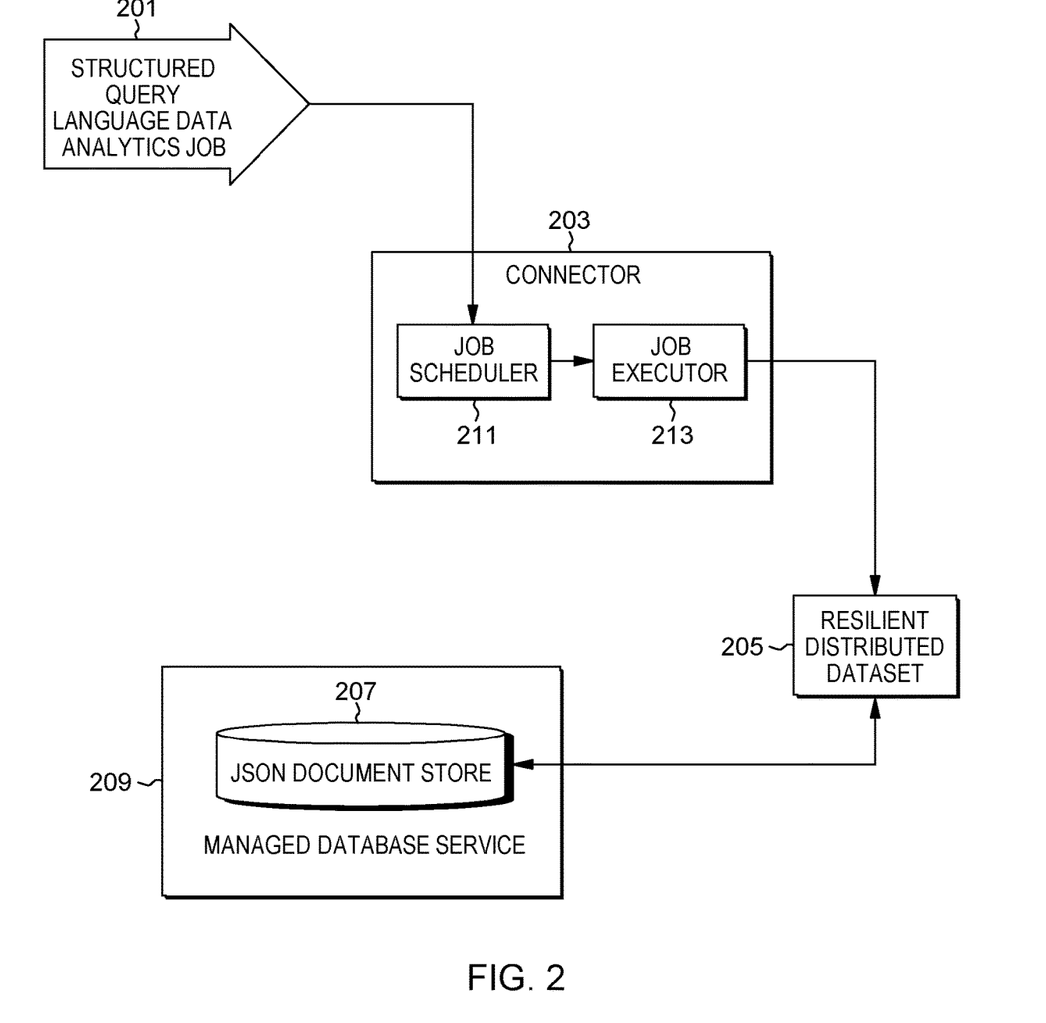
FIG. 2 illustrates an exemplary method for processing a data analytics job in accordance with one or more embodiments of the present invention.

FIG. 2 illustrates an exemplary method for processing a data analytics job in accordance with one or more embodiments of the present invention. For purposes of illustration, the data analytics job may be processed using a Spark™ processing framework in conjunction with a Cloudant™ distributed document storage database. As mentioned previously, Spark™ is a parallel, open-source processing framework for running large-scale data analytics applications across clustered computers. Spark™ is described herein for illustrative purposes, as another type of data analytics framework may be used in lieu of, or in addition to, Spark™.

For purposes of illustration, the distributed document storage database is a JSON document store 207 provided by a managed database service 209 such as Cloudant™. Cloudant™ is a managed service for managing a distributed database such as the JSON document store 207. Cloudant™ and JSON are described herein for illustrative purposes, as another type of database manager may be used in lieu of, or in addition to, Cloudant™ Similarly, another type of distributed database may be used in lieu of, or in addition to, the JSON document store 207.

Cloudant™ is offered in at least three forms: Cloudant Shared™, Cloudant Enterprise database-as-a-service (DBaaS)™, and Cloudant Local™. All three forms offer an Application Program Interface (API). Cloudant Shared™ runs on a multi-tenant infrastructure. Accounts are provisioned for customers on a shared database cluster. Cloudant Enterprise DBaas™ runs on a single-tenant, dedicated infrastructure to provide a high level of performance and availability. The single-tenant architecture is provided by provisioning bare-metal hardware, or by using virtual infrastructure on providers such as SoftLayer™ (an IBM company); Rackspace™; AWS™; and Microsoft Azure™. Cloudant Local™ is an on-premises version of Cloudant™ software that companies can install locally in their own data centers to run their own DBaaS. A local cluster includes machines dedicated for either a load balancer (a minimum of one machine is required), or a database server node (a minimum of three machines are required). While Cloudant Local™ provides management tools, software, and techniques, the customer manages the infrastructure and tunes the software.

With reference to FIG. 2, a Structured Query Language (SQL) data analytics job 201 is received at a connector 203. The connector 203 is configured for transforming JSON objects in the JSON document store 207 of the managed database service 209 into a resilient distributed dataset (RDD) 205 in order to perform data analytics. The connector 203 configures data source meta-information of the managed database service 209 for use with the data analytics framework, including configuration of data source connection Uniform Resource Locators (URLs), as well as a schema for context. The connector 203 reads JSON documents from the JSON document store 207, creates a resilient distributed dataset (RDD) 205, and submits the SQL data analytics job 201 to the managed database service 209 for execution.

The connector 203 is used to leverage the JSON document store 207 as a data source for performing massive data analytics. This capability is becoming increasingly relevant, as more and more web and mobile applications present strong data analytics requirements for JSON data. However, data analytics applications, such as Spark™, use an in-memory data structure—namely, the RDD 205—for performing massive data analytics. Conventional approaches for using data analytics applications in conjunction with the JSON document store 207 require all data to be reloaded if any data update has occurred at the JSON document store 207. This requirement places practical limitations on the usage of the JSON document store 207 with data analytics procedures.

Many actual data analytics jobs are not one-time jobs. Thus, submitting the SQL data analytics job 201 via the connector 203 results in performance problems when the managed database service 209 has performed data updates to the JSON document store 207. For example, disk storage space and network input/output (I/O) are wasted for re-fetching JSON documents from the JSON document store 207 to the connector 203. Moreover, central processing unit (CPU) capacity of the connector 203 is wasted for reading and transforming JSON documents into the RDD 205.

In accordance with a set of exemplary embodiments disclosed herein, data analytics on the JSON document store 207 may be speeded up by determining whether or not a data analytics job can be performed more efficiently simply by updating the JSON document store 207, as opposed to newly re-fetching all JSON documents from the JSON document store 207. This determination is performed using a cost model that selects a minimum cost option from among a first cost and a second cost. The first cost represents a cost for merging an incremental update for the data analytics job into a first resilient distributed dataset (RDD). The second cost represents a cost for newly creating a second RDD for the data analytics job.

The first cost may comprise one or more of: a third cost of at least one input/output operation at the distributed document storage database attributable to merging an incremental data update for the data analytics job into the first resilient distributed dataset; a fourth cost of at least one network input/output operation from the distributed document storage database attributable to merging the incremental data update for the data analytics job into the first resilient distributed dataset; or a fifth cost of transforming one or more documents in the distributed document storage database to the first resilient distributed dataset. Thus, the fourth cost represents a cost of at least one input/output (I/O) operation at the JSON document store 207 which is attributable to a data analytics procedure. The fifth cost comprises a cost of at least one network I/O operation from the JSON document store 207 to the data analytics procedure. The sixth cost comprises a cost of transforming JSON documents in the JSON document store 207 to the RDD 205.

The second cost may comprise one or more of: a sixth cost of at least one input/output operation at the distributed document storage database attributable to newly creating the second resilient distributed dataset for the data analytics job; a seventh cost of at least one network input/output operation from the distributed document storage database attributable to newly creating the second resilient distributed dataset for the data analytics job; or an eighth cost of transforming one or more documents in the distributed document storage database to the second resilient distributed dataset. Thus, the sixth cost represents a cost of at least one input/output (I/O) operation at the JSON document store 207 which is attributable to a Spark™ data analytics procedure. The seventh cost comprises a cost of at least one network I/O operation from the JSON document store 207 to the data analytics procedure. The eighth cost comprises a cost of transforming JSON documents in the JSON document store 207 to the RDD 205.

Let J be an SQL job which will run repeatedly at a regular interval T, whose data source is a JSON document store 207 using a specific schema S. For example, the regular interval T may comprise every Monday at midnight. Let D be the total size of JSON documents for J at a last (most recent) execution time T_last. Three challenges exist for supporting J with incremental data updates at T_start=T_last+T where T_start is a starting time of a new J. A first challenge is determining how many JSON documents have been updated since T_start, and identifying these updated documents. A second challenge is determining which of the following procedures is more efficient—reading only newly updated data, or re-fetching all JSON documents from scratch. A third challenge is determining how to merge updates with a set of original RDDs, such as the RDD 205, to produce new RDDs for a new J.

Figure 3:
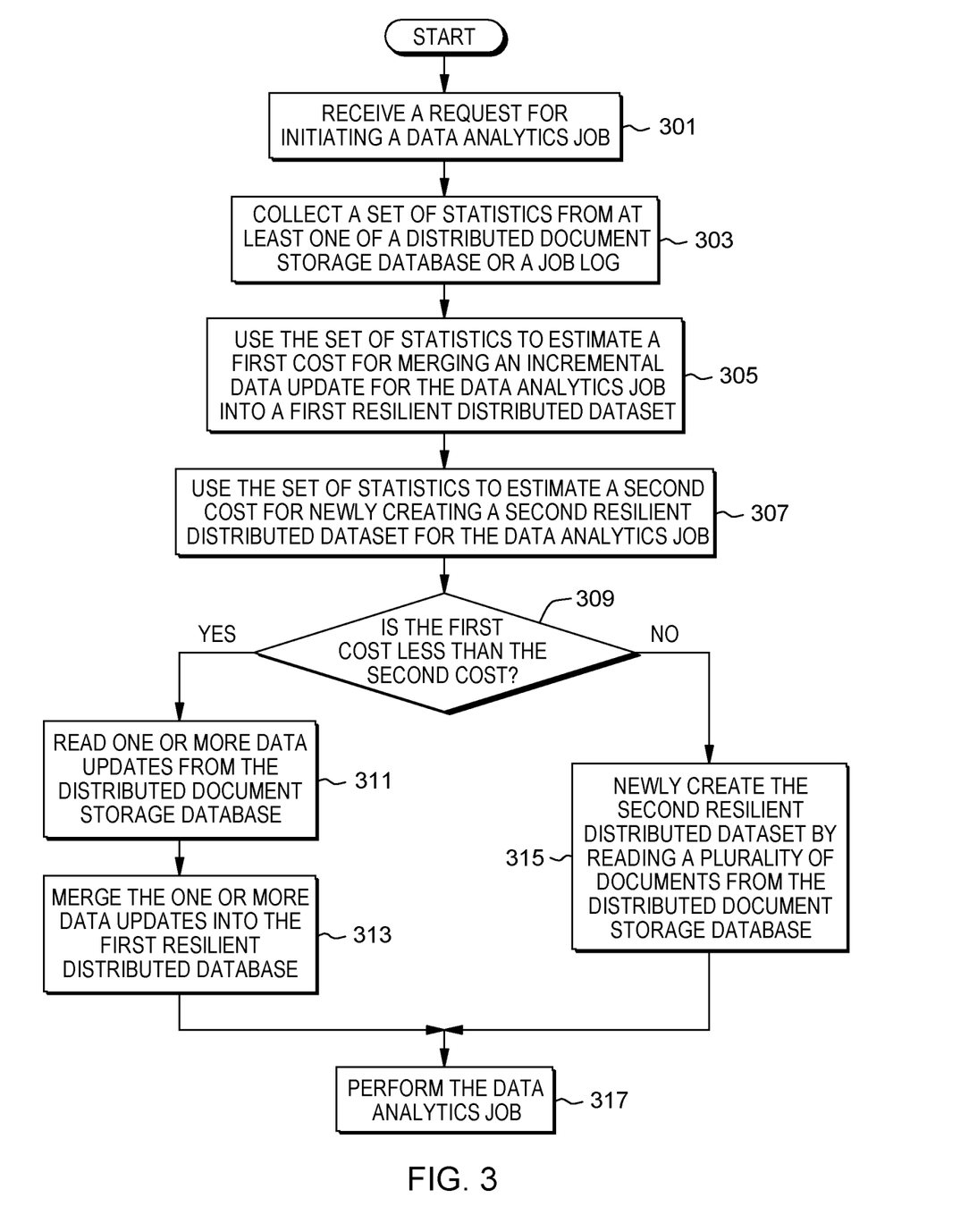
FIG. 3 is a flowchart illustrating a first exemplary method for performing data analytics in accordance with one or more embodiments of the present invention.

FIG. 3 is a flowchart illustrating a first exemplary method for performing data analytics in accordance with one or more embodiments of the present invention. The method commences at block 301 where a request is received for initiating a data analytics job. Next, at block 303, a set of statistics is collected from at least one of a distributed document storage database or a job log in response to the request. For example, the set of statistics may be collected from the JSON document store 207 (FIG. 2). The set of statistics is used to estimate a first cost for merging an incremental data update for the data analytics job into a first resilient distributed dataset (FIG. 3, block 305). Further details are provided in FIG. 6, to be described in greater detail hereinafter. The set of statistics is also used to estimate a second cost for newly creating a second resilient distributed dataset for the data analytics job (block 307). Note that blocks 305 and 307 may be performed in any order or substantially contemporaneously.

The method advances to block 309 where a test is performed to determine whether or not the first cost is less than the second cost. When the first cost is less than the second cost, the method advances to block 311 where one or more data updates are read from the distributed document storage database such as the JSON document store 207 (FIG. 2). For example, this step may be performed by querying the JSON document store 207 to collect data updates. Then, at block 313 (FIG. 3), the one or more data updates are merged into the first resilient distributed dataset. This step may be performed, for example, by submitting a Spark™ RDD merge job to Spark™ to produce one or more new RDDs for the RDD 205 (FIG. 2). The negative branch from block 309 (FIG. 3) leads to block 315. When the first cost is not less than the second cost, the second resilient distributed dataset is newly created by reading all documents from the distributed document storage database. This step may be performed, for example, by using the original data analytics job of block 301. The program advances from block 313 or block 315 to block 317 where the data analytics job is performed.

Figure 4:
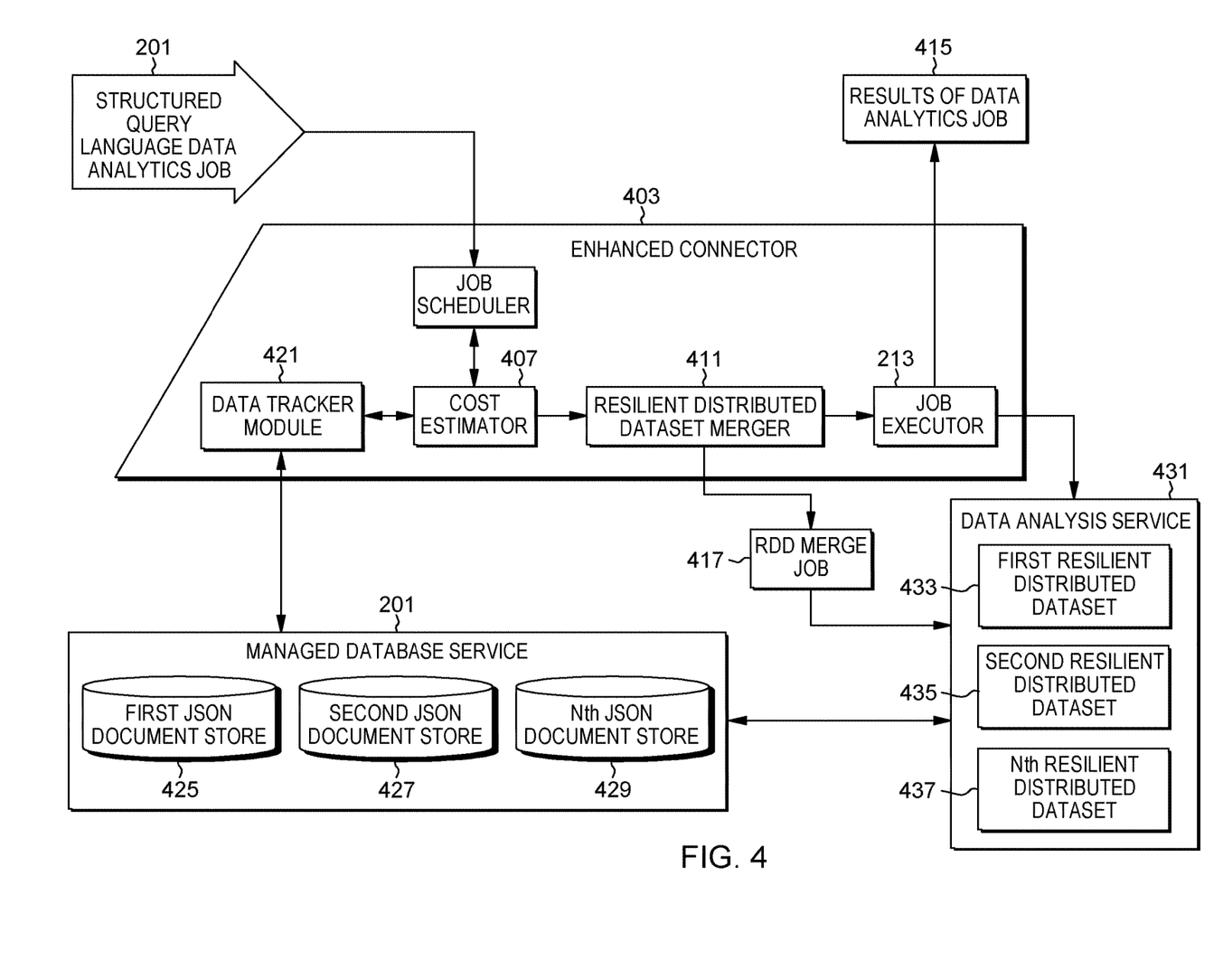
FIG. 4 illustrates a system for performing data analytics in accordance with one or more embodiments of the present invention.

FIG. 4 illustrates a system for performing data analytics in accordance with one or more embodiments of the present invention. For purposes of illustration, the data analytics job may be processed using a Spark™ processing framework in conjunction with a Cloudant™ distributed document storage database. As mentioned previously, Spark™ is a parallel, open-source processing framework for running large-scale data analytics applications across clustered computers. Spark™ is described herein for illustrative purposes, as another type of data analytics framework may be used in lieu of, or in addition to, Spark™.

A managed database service 409 is configured for managing distributed databases. One illustrative implementation of the managed database service 409 is Cloudant™. For purposes of illustration, the managed database service 409 includes a first JSON document store 425, a second JSON document store 427, and an Nth JSON document store 429, where N is a positive integer greater than two. Cloudant™ and JSON are described herein for illustrative purposes, as another type of managed database service may be used in lieu of, or in addition to, Cloudant™. Similarly, another type of distributed database may be used in lieu of, or in addition to, the first JSON document store 425, the second JSON document store 427, and the Nth JSON document store 429.

With reference to FIG. 4, a Structured Query Language (SQL) data analytics job 201 is received at an enhanced connector 403. The enhanced connector 403 includes a data tracker module 421, a cost estimator 407, and a resilient distributed dataset (RDD) merger 411. The enhanced connector 403 is configured for transforming JSON objects in any of the respective first, second, and Nth JSON document stores 425, 427 and 429 into a corresponding resilient distributed dataset (RDD) of a first resilient distributed dataset (RDD) 433, a second resilient distributed dataset (RDD) 435, or an Nth resilient distributed dataset (RDD) 437 in order to perform data analytics. The first, second, and Nth RDDs 433, 435, and 437 are provided by a data analysis service 431 configured for performing a data analytics application such as, for example, Spark™.

The enhanced connector 403 configures data source meta-information of the managed database service 409 for use with the data analytics processing framework, including configuration of data source connection Uniform Resource Locators (URLs), as well as a schema for context. The enhanced connector 403 reads JSON documents from any respective JSON document store of the first, second, and Nth JSON document stores 433, 435, and 437, creates a corresponding resilient distributed dataset (RDD) such as the first, second, or Nth RDD 433, 435, and 437, and submits the SQL data analytics job 201 to the managed database service 409 for execution.

The enhanced connector 403 is used to leverage the managed database service 409 as a data source for performing massive data analytics. This capability is becoming increasingly relevant, as more and more web and mobile applications present strong data analytics requirements for JSON data. However, data analytics applications such as Spark™, for example, use an in-memory data structure—namely, the RDDs 433, 435, and 437—for performing massive data analytics. Conventional approaches for using data analytics applications in conjunction with the managed database service 409 require all data to be reloaded if any data update has occurred to any of the first, second, or Nth JSON document stores 425, 427 and 429. This requirement places practical limitations on the usage of the first, second, or Nth JSON document stores 425, 427 and 429 with data analytics procedures.

Many actual data analytics jobs are not one-time jobs. However, submitting the SQL data analytics job 201 via the enhanced connector 403 using the procedure of FIG. 3 reduces or eliminates performance problems when the managed database service 409 (FIG. 4) has performed data updates to any of the first, second, or Nth JSON document stores 425, 427 and 429. For example, disk storage space and network input/output (I/O) are conserved by selectively re-fetching JSON documents from the JSON document stores 425, 427 or 429 to the enhanced connector 403. Moreover, central processing unit (CPU) capacity of the connector 403 is conserved by selectively reading and transforming JSON documents into the data analysis service 431.

In accordance with a set of exemplary embodiments disclosed herein, data analytics on the first, second, and Nth JSON document stores 425, 427 and 429 are speeded up by determining whether or not data analytics can be performed simply by updating at least one of the first, second, and Nth JSON document stores 425, 427 and 429, as opposed to newly re-fetching all JSON documents from the JSON document stores 425, 427 and 429. This determination is performed using the cost estimator 407. The cost estimator 407 minimizes at least one of a first cost, a second cost, or a third cost. The first cost comprises a cost of disk input/output (I/O) at one or more of the first, second, or Nth JSON document stores 425, 427 and 429 with regard to the data analysis service 431. The second cost comprises a cost of network I/O from one or more of the first, second, or Nth JSON document stores 425, 427, and 429 to the data analysis service 431. The third cost comprises a cost of transforming JSON documents in any of the first, second, and Nth JSON document stores 425, 427 and 429 to the data analysis service 431.

Let J be an SQL job which will run repeatedly at a regular interval T, whose data source is a JSON document store 207 using a specific schema S. For example, the regular interval T may comprise every Monday at midnight. Let D be the total size of JSON documents for J at a last (most recent) execution time T_last. The system of FIG. 4 is configured for supporting J with incremental data updates at T_start=T_last+T where T_start is a starting time of a new J. The data tracker module 421 determines how many JSON documents have been updated in the managed database service 409 since T_start, and identifies these updated documents. The cost estimator 407 determines which of the following procedures is more efficient—reading only newly updated data, or re-fetching all JSON documents from the managed database service 409 from scratch. The RDD merger 411 determines how to merge updates with a set of original RDDs, such as the first, second, and third RDDs 433, 435, and 437, to produce new RDDs for a new J. The RDD merger 411 performs this merging task by formulating an RDD merge job 417 and forwarding the merge job 417 to the data analysis service 431.

The RDD merger 411 is configured for performing two transform operations, filter and union, to merge data updates into an existing RDD for a JSON document store, to thereby provide a first new RDD and a second new RDD for a current data analytics job. More specifically, a first set of documents is obtained from the first, second, and Nth JSON document stores 425, 427 and 429 where each of the documents in the first set is either deleted or updated. Then, the filter operation is used on the existing RDD to filter out all of these deleted or updated documents to generate the first new RDD. Next, a second set of documents is obtained from the first, second, and Nth JSON document stores 425, 427 and 429 where each of the documents in the second set is either updated or created. The second new RDD is generated for this second set of documents. Then, a union transformation is used to combine the first new RDD with the second new RDD to form a newly updated RDD that includes merged data updates.

The enhanced connector 403 supports performing data analytics on any of the first, second, or Nth JSON document stores 425, 427 and 429 with incremental data updates, instead of reloading all data in the JSON document stores 425, 427 and 429 from scratch. Specifically, the data tracker module 421, the cost estimator 407, and the RDD merger 411 are used to provide the enhanced connector 403. The data tracker module 421, the cost estimator 407, and the RDD merger 411, are operatively coupled between the managed database service 409 and the data analysis service 431. The data tracker module 421 is configured for tracking data changes at any of the first, second, or Nth JSON document stores 425, 427 and 429. The data tracker module 421 is also configured for determining, in response to a re-execution of the SQL data analytics job 201, whether or not a data reload is necessary. The RDD merger 411 is configured for merging all updated JSON objects in any of the first, second, or Nth JSON document stores 425, 427 and 429 to a previous RDD of the first, second, or Nth RDDs 433, 435, or 437 for the re-executed SQL data analytics job 201. Thus, the enhanced connector 403 reduces I/O costs associated with data transformation and improves the overall performance of a data analytics system that combines one or more JSON document stores, such as the first, second, or third JSON document stores 425, 427 and 429 with the data analysis service 431.

Figure 5:
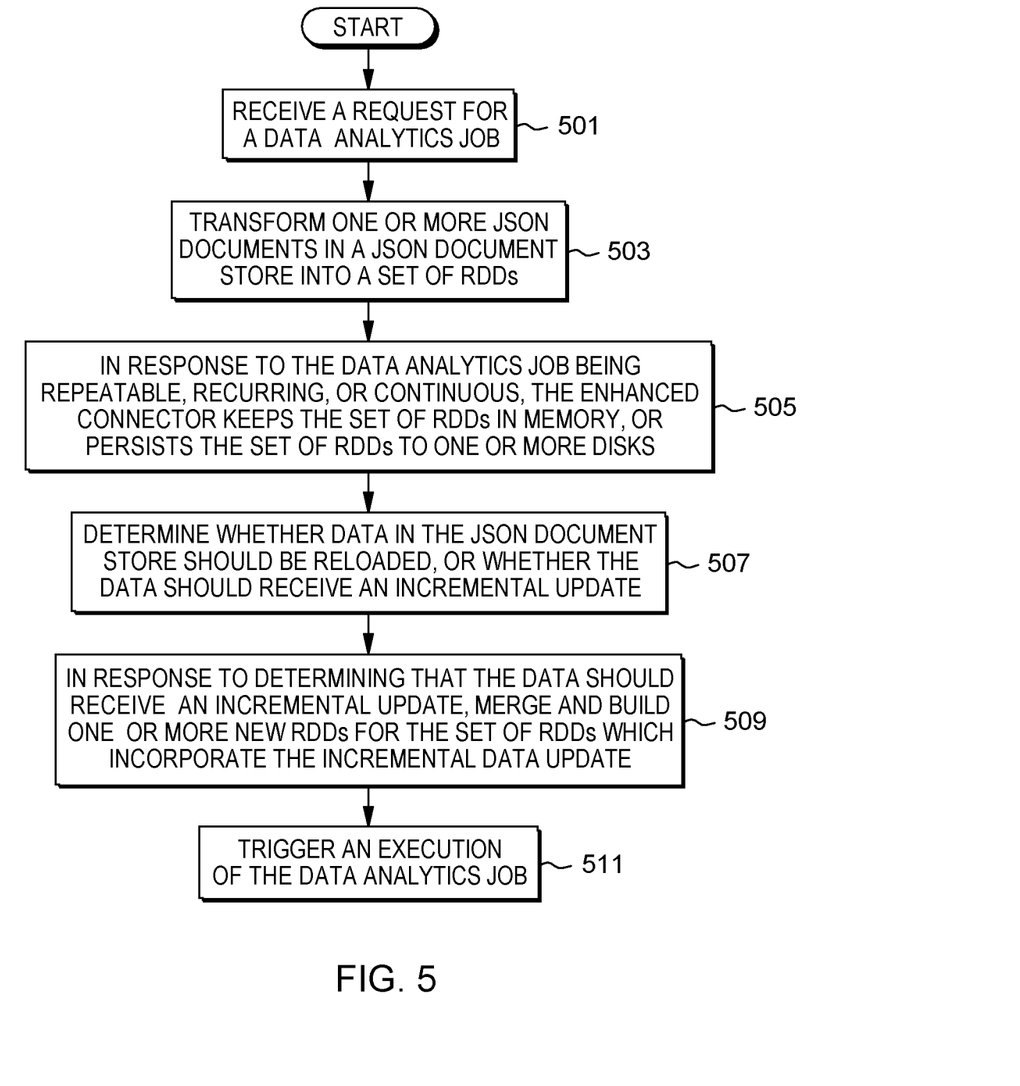
FIG. 5 is a flowchart illustrating a second exemplary method for performing data analytics in accordance with one or more embodiments of the present invention.

FIG. 5 is a flowchart illustrating a second exemplary method for performing data analytics in accordance with one or more embodiments of the present invention. The method commences at block 501 where a request for a data analytics job is received. Next, at block 503, one or more JSON documents in a JSON document store are transformed into a set of RDDs. For example, at least one of the respective first, second, or Nth JSON document stores 425, 427 or 429 (FIG. 4) may be transformed into a corresponding set of RDDs including one or more of the first, second, or Nth RDDs 433, 435, or 437. Next, at block 505 (FIG. 5), in response to the data analytics job being repeatable, recurring, or continuous, the enhanced connector 403 (FIG. 4) keeps the corresponding set of RDDs in memory, or persists the corresponding set of RDDs to one or more disks of a data cluster. Block 505 (FIG. 5) reduces I/O and network costs.

The operational sequence of FIG. 5 progresses to block 507 where a determination is made as to whether data in the respective JSON document store 425, 427 and 429 (FIG. 4) should be reloaded, or whether the data should simply receive an incremental update. This step may be performed using the data tracker module 421. For example, users may be provided with an option to instruct the data tracker module 421 to implement an eager option or a lazy option. The eager option performs incremental updating of the corresponding set of RDDs when an update volume at the respective JSON document store 425, 427 or 429 exceeds a user or system-predefined threshold. The lazy option, reloading all documents in the JSON document stores 425, 427 and 429, is only implemented at job re-execution. Then, at block 509 (FIG. 5), in response to determining that the data should receive an incremental update, one or more new RDDs are merged and built for the corresponding set of RDDs which incorporate the incremental data update. This step may be performed using the RDD merger 411 (FIG. 4). Next, at block 511 (FIG. 5), an execution of the data analytics job is triggered.

Figure 6:
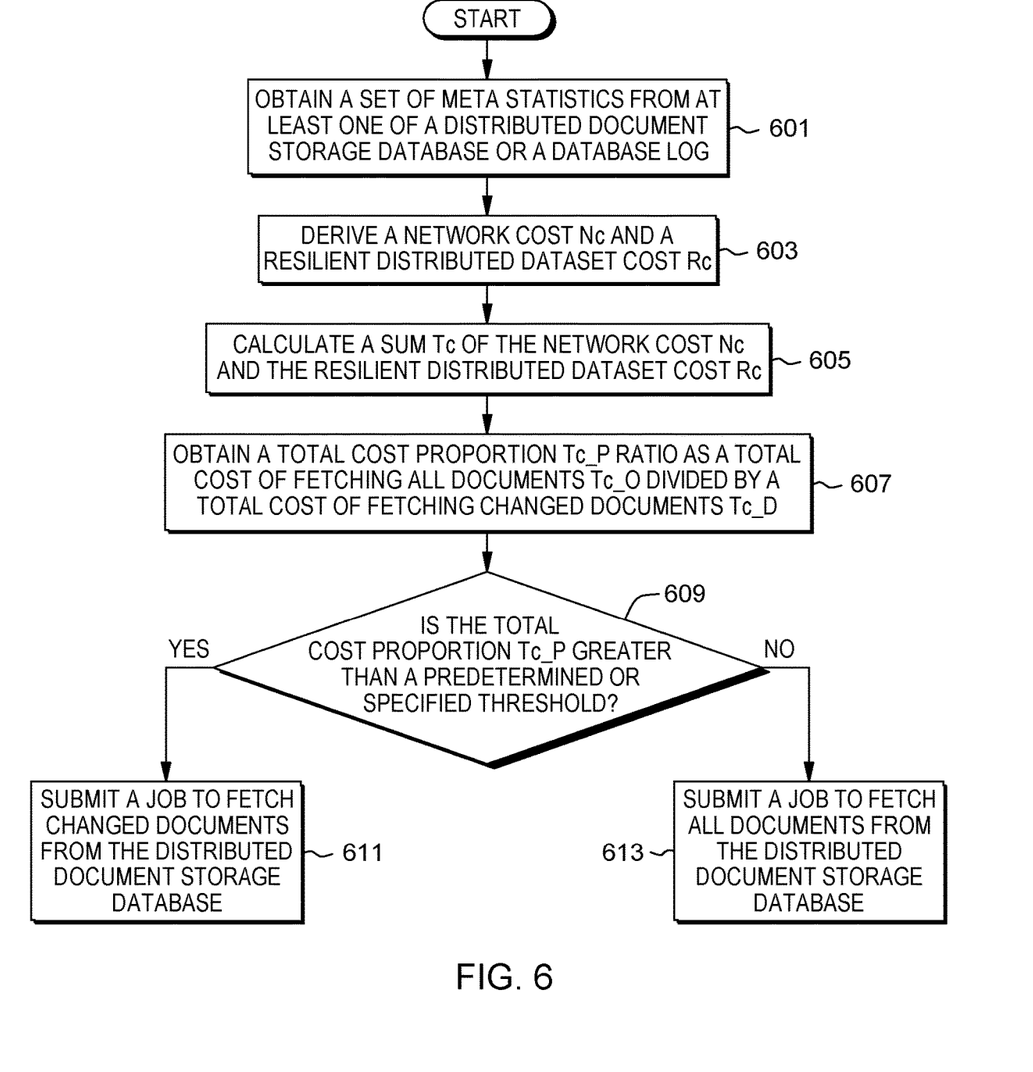
FIG. 6 is a flowchart illustrating an exemplary method for estimating a cost of performing data analytics in accordance with one or more embodiments of the present invention.

FIG. 6 is a flowchart illustrating an exemplary method for estimating a cost of performing data analytics in accordance with one or more embodiments of the present invention. This estimating step was previously described, for example, in conjunction with block 305 of FIG. 3.

The operational sequence of FIG. 6 commences at block 601 where a set of meta statistics is obtained from at least one of a distributed document storage database or a database log. The distributed document storage database may comprise one or more JSON document stores 425, 427 or 429 (FIG. 4). For example, the enhanced connector 403 is configured for gathering one or more of the following meta statistics: data_size (Ds), doc_count(Dc), document identifiers (ids) including ids_deleted(Ids_D), ids_updated (Ids_U), ids_created (Ids_C), network_throughput (MB/s) (Nt_T), and rdd_merge_throughput(Doc count/s) (rdd_m_T). The network_throughput and rdd_merge_throughput can be obtained by scheduling tests prior to fetching RDDs or by using values from an immediately preceding job execution.

The operational sequence of FIG. 6 progresses to block 603 where one or more meta statistics are derived from the gathered meta statistics. The derived statistics may include, for example, a network cost Nc and a resilient distributed dataset (RDD) cost Rc. It may be noted that the enhanced connector 403 (FIG. 4) is configured for deriving one or more of the following meta statistics from the gathered meta statistics: average_doc_size (avg_Ds)=Ds/Dc; update_size (Us)=(Ids_U=Ids_C)*avg_Ds; network_cost (Nc)=Us/Nt_T; rdd_cost(Rc)=(Ids_D+Ids_U+Ids_C))/rdd_m_T; total_cost (Tc)=Rc+Nc; total cost of fetching all documents from a JSON store (Tc_O); total cost of fetching changed documents from the JSON store (Tc_D); and a total_cost_proportion (Tc_P) ratio=Tc_O/Tc_D. Changed documents refer to documents that have been edited. Unchanged documents have not been edited after being saved to the JSON store.

Next, at block 605 (FIG. 6), the total_cost (Tc) is calculated as a sum of the network cost Nc and the RDD cost Rc. Then, at block 607, the total_cost_proportion Tc_P ratio is calculated as the total cost of fetching all documents from the JSON store (Tc_O) divided by the total cost of fetching changed documents from the JSON store (Tc_D). A test is performed at block 609 to ascertain whether or not the total_cost_proportion Tc_P ratio is greater than a predetermined or specified threshold. If so, a job is submitted to fetch changed documents from the distributed document storage database (block 611). The negative branch from block 609 leads to block 613 where a job is submitted to fetch all documents from the distributed document storage database.

Figure 7:
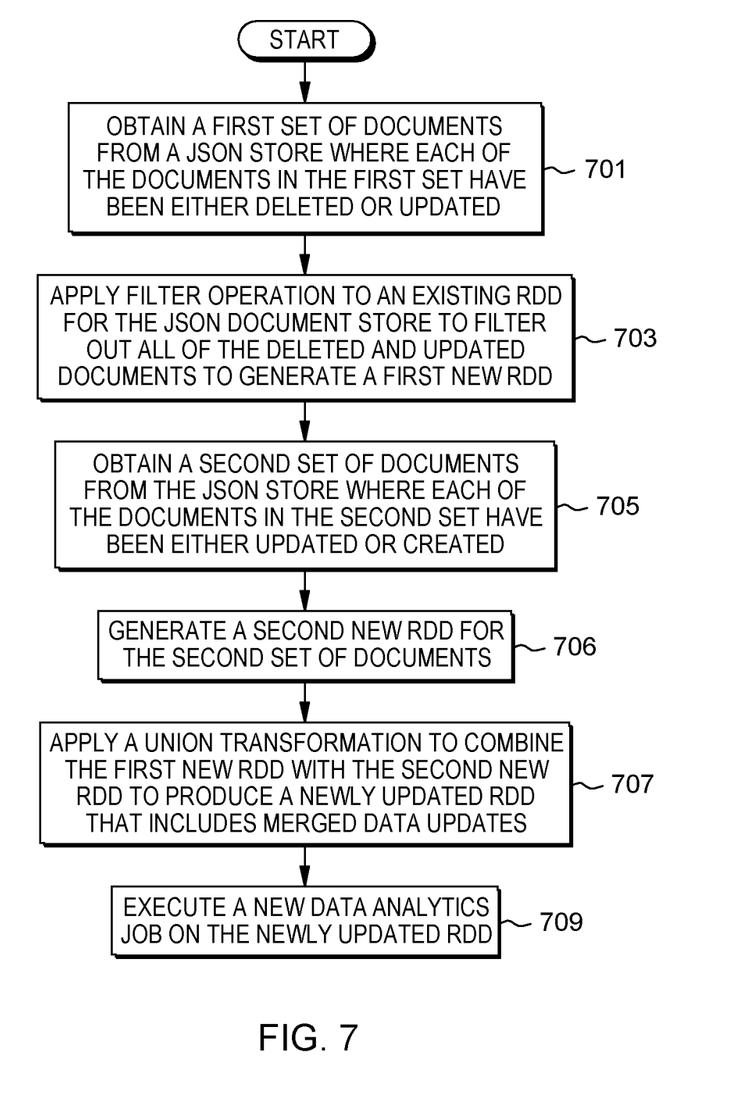
FIG. 7 is a flowchart illustrating an exemplary method for merging a resilient distributed dataset with one or more data updates in accordance with one or more embodiments of the present invention.

FIG. 7 is a flowchart illustrating an exemplary method for merging a resilient distributed dataset with one or more data updates in accordance with one or more embodiments of the present invention. Illustratively, the operational sequence of FIG. 7 may be used to implement block 313 of FIG. 3 where one or more data updates are merged into the first RDD. Block 313 may be performed by submitting an RDD merge job to a data analytics application, such as Spark™, to produce one or more new RDDs for the RDD 205 (FIG. 2). The merging procedure of FIG. 7 may be performed using the RDD merger 411 of FIG. 4.

The procedure of FIG. 7 commences at block 701 where a first set of documents is obtained from a JSON document store (such as any of the first, second, or Nth JSON document stores 425, 427 and 429 of FIG. 4), where each of the documents in the first set is either deleted or updated. Then, at block 703 (FIG. 7), a filter operation is used on an existing RDD for the JSON document store to filter out all of these deleted or updated documents to generate a first new RDD. Thus, all documents whose identifier (Ids) is from a set comprising deleted Ids and updated Ids (Ids_D+Ids_U) are removed from the existing RDD to produce the first new RDD. This step may be performed by using a filter transform operation rdd.filter(func) where func returns True if a key of a current data item in Ids_D+Ids_U first RDD (rdd1)=rdd.filter(func(id)), where func(id) returns True if id is in Ids_D+Ids_u.

Next, at block 705, a second set of documents is obtained from the JSON document store, where each of the documents in the second set is either updated or created. Then, at block 706, a second new RDD is generated for this second set of documents. For example, let all documents in the set Ids_D+Ids_U be denoted as Doc. Read these documents to the second new RDD denoted as rdd2=spark.json.read(Doc).

The operational sequence of FIG. 7 progresses to block 707 where a union transformation is used to combine the first new RDD with the second new RDD to form a newly updated RDD that includes merged data updates: (rdd_new=rdd1.union(rdd2). Then, at block 709, a new data analytics job is executed on the newly updated RDD.

Figure 8:
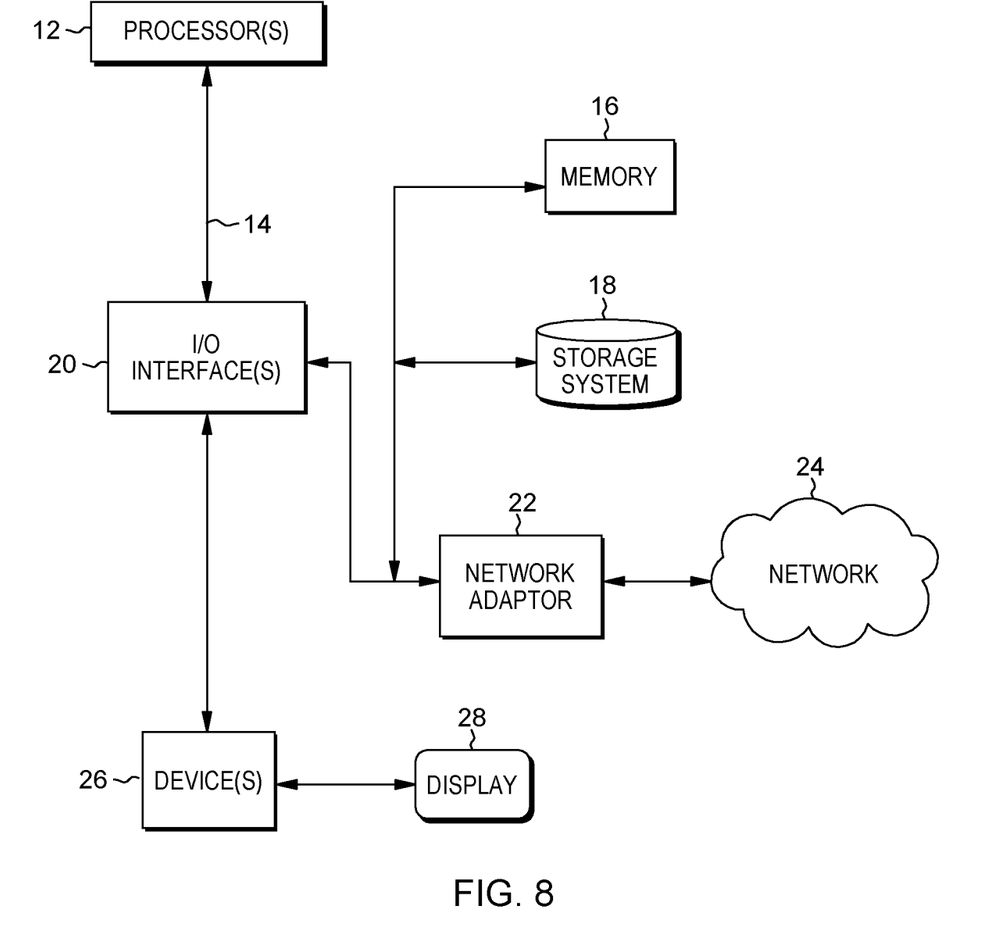
FIG. 8 illustrates an exemplary network for performing data analytics in accordance with in accordance with one or more embodiments of the present invention.

FIG. 8 illustrates an exemplary network for performing data analytics in accordance with one or more embodiments of the present invention. This computer system is only one example of a suitable processing system and is not intended to suggest any limitation as to the scope of use or functionality of embodiments of the methodology described herein. The processing system shown may be operational with numerous other general-purpose or special-purpose computing system environments or configurations. Examples of well-known computing systems, environments, and/or configurations that may be suitable for use with the processing system shown in FIG. 8 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of the computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for performing data analytics on a distributed document storage database, the method comprising:
   receiving a request for a data analytics, said distributed document storage database subject to receiving incremental data updates;
   requesting and receiving a set of statistics from the distributed document storage database in response to the request;
   using the set of statistics to estimate a first cost for merging an incremental data update associated with the data analytics into a first resilient distributed dataset;
   using the set of statistics to estimate a second cost for creating a second resilient distributed dataset associated with the data analytics;
   comparing the first cost to the second cost and, when the first cost is less than the second cost, requesting and receiving one or more incremental data updates from the distributed document storage database and merging the one or more data updates into the first resilient distributed dataset; and
   when the first cost is not less than the second cost, re-creating the second resilient distributed dataset by requesting and receiving at least one changed document and at least one unchanged document from the distributed document storage database, wherein the collecting of the set of statistics is performed by:
   gathering the set of statistics from the distributed document storage database;
   deriving a network cost and a resilient distributed dataset cost from the gathered set of statistics;
   calculating a total cost as a sum of the network cost and the resilient distributed dataset cost;
   calculating a total cost proportion as a total cost of fetching any changed and any unchanged documents from the distributed document storage database divided by a total cost of fetching changed documents from the distributed document storage database;
   when the total cost proportion is greater than a predetermined or specified threshold, submitting a first job to fetch any changed documents from the distributed document storage database; and
   when the total cost proportion is not greater than a predetermined or specified threshold, submitting a second job to fetch any changed and any unchanged documents from the distributed document storage database.

2. The computer-implemented method of claim 1, further comprising using a parallel processing framework to perform the data analytics job on a set of clustered computers, and when the first cost is not less than the second cost, re-creating the second resilient distributed dataset by requesting and receiving all changed documents and all unchanged documents from the distributed document storage database.

3. The computer-implemented method of claim 1, wherein the first cost further comprises one or more of: a third cost of at least one input/output operation at the distributed document storage database attributable to merging an incremental data update for the data analytics job into the first resilient distributed dataset; a fourth cost of at least one network input/output operation from the distributed document storage database attributable to merging the incremental data update for the data analytics job into the first resilient distributed dataset; or a fifth cost of transforming one or more documents in the distributed document storage database to the first resilient distributed dataset.

4. The computer-implemented method of claim 1, wherein the second cost further comprises one or more of: a sixth cost of at least one input/output operation at the distributed document storage database attributable to newly creating the second resilient distributed dataset for the data analytics job; a seventh cost of at least one network input/output operation from the distributed document storage database attributable to newly creating the second resilient distributed dataset for the data analytics job; or an eighth cost of transforming one or more documents in the distributed document storage database to the second resilient distributed dataset.

5. The computer-implemented method of claim 1, wherein the merging is performed by:
   obtaining a first set of documents from the distributed document storage database, wherein each document in the first set of documents has been either deleted or updated;
   applying a filter operation to an existing resilient distributed dataset for the distributed document storage database to filter out all of the deleted and updated documents to generate a first new resilient distributed dataset;
   obtaining a second set of documents from the distributed document storage database wherein each of the documents in the second set of documents has been either updated or created;
   generating a second new resilient distributed dataset for the second set of documents; and
   applying a union transformation to combine the first new resilient distributed dataset with the second resilient distributed dataset to produce a newly updated resilient distributed dataset that includes merged data updates.

6. A computer program product for performing data analytics on a distributed document storage database, the computer program product comprising a computer-readable storage medium having a computer-readable program stored therein, wherein the computer-readable program, when executed on a processor, causes the processor to:
receive a request for initiating a data analytics job;
collect a set of statistics from the distributed document storage database in response to the request;
use the set of statistics to estimate a first cost for merging an incremental data update for the data analytics job into a first resilient distributed dataset;
use the set of statistics to estimate a second cost for newly creating a second resilient distributed dataset for the data analytics job;
compare the first cost to the second cost and, when the first cost is less than the second cost, read one or more data updates from the distributed document storage database and merge the one or more data updates into the first resilient distributed dataset; and
when the first cost is not less than the second cost, newly create the second resilient distributed dataset by reading at least one changed document and at least one unchanged document from the distributed document storage database, wherein the collecting of the set of statistics is performed by:
gathering the set of statistics from the distributed document storage database;
deriving a network cost and a resilient distributed dataset cost from the gathered set of statistics;
calculating a total cost as a sum of the network cost and the resilient distributed dataset cost;
calculating a total cost proportion as a total cost of fetching any changed and any unchanged documents from the distributed document storage database divided by a total cost of fetching changed documents from the distributed document storage database;
when the total cost proportion is greater than a predetermined or specified threshold, submitting a first job to fetch any changed documents from the distributed document storage database; and
when the total cost proportion is not greater than a predetermined or specified threshold, submitting a second job to fetch any changed and any unchanged documents from the distributed document storage database.

7. The computer program product of claim 6 further configured for using a parallel processing framework to perform the data analytics job on a set of clustered computers, and when the first cost is not less than the second cost, re-creating the second resilient distributed dataset by requesting and receiving all changed documents and all unchanged documents from the distributed document storage database.

8. The computer program product of claim 6, wherein the first cost further comprises one or more of: a third cost of at least one input/output operation at the distributed document storage database attributable to merging an incremental data update for the data analytics job into the first resilient distributed dataset; a fourth cost of at least one network input/output operation from the distributed document storage database attributable to merging the incremental data update for the data analytics job into the first resilient distributed dataset; or a fifth cost of transforming one or more documents in the distributed document storage database to the first resilient distributed dataset.

9. The computer program product of claim 6, wherein the second cost further comprises one or more of: a sixth cost of at least one input/output operation at the distributed document storage database attributable to newly creating the second resilient distributed dataset for the data analytics job; a seventh cost of at least one network input/output operation from the distributed document storage database attributable to newly creating the second resilient distributed dataset for the data analytics job; or an eighth cost of transforming one or more documents in the distributed document storage database to the second resilient distributed dataset.

10. The computer program product of claim 6, further configured for performing the merging by:
obtaining a first set of documents from the distributed document storage database, wherein each document in the first set of documents has been either deleted or updated;
applying a filter operation to an existing resilient distributed dataset for the distributed document storage database to filter out all of the deleted and updated documents to generate a first new resilient distributed dataset;
obtaining a second set of documents from the distributed document storage database wherein each of the documents in the second set of documents has been either updated or created;
generating a second new resilient distributed dataset for the second set of documents; and
applying a union transformation to combine the first new resilient distributed dataset with the second resilient distributed dataset to produce a newly updated resilient distributed dataset that includes merged data updates.

11. An apparatus for performing data analytics on a distributed document storage database, the apparatus comprising a processor and a memory coupled to the processor, wherein the memory comprises instructions which, when executed by the processor, cause the processor to:
receive a request for initiating a data analytics job;
collect a set of statistics from the distributed document storage database in response to the request;
use the set of statistics to estimate a first cost for merging an incremental data update for the data analytics job into a first resilient distributed dataset;
use the set of statistics to estimate a second cost for newly creating a second resilient distributed dataset for the data analytics job;
compare the first cost to the second cost and, when the first cost is less than the second cost, read one or more data updates from the distributed document storage database and merge the one or more data updates into the first resilient distributed dataset; and
when the first cost is not less than the second cost, create the second resilient distributed dataset by reading at least one changed document and at least one unchanged document from the distributed document storage database, wherein to collect the set of statistics, said instructions further cause the processor to:
gather the set of statistics from the distributed document storage database;
derive a network cost and a resilient distributed dataset cost from the gathered set of statistics;
calculate a total cost as a sum of the network cost and the resilient distributed dataset cost;
calculate a total cost proportion as a total cost of fetching any changed and any unchanged documents from the distributed document storage database divided by a total cost of fetching changed documents from the distributed document storage database;
when the total cost proportion is greater than a predetermined or specified threshold, submitting a first job to fetch any changed documents from the distributed document storage database; and when the total cost proportion is not greater than a predetermined or specified threshold, submitting a second job to fetch any changed and any unchanged documents from the distributed document storage database.

12. The apparatus of claim 11 further configured for using a parallel processing framework to perform the data analytics job on a set of clustered computers, and when the first cost is not less than the second cost, re-creating the second resilient distributed dataset by requesting and receiving all changed documents and all unchanged documents from the distributed document storage database.

13. The apparatus of claim 11, wherein the first cost further comprises one or more of: a third cost of at least one input/output operation at the distributed document storage database attributable to merging an incremental data update for the data analytics job into the first resilient distributed dataset; a fourth cost of at least one network input/output operation from the distributed document storage database attributable to merging the incremental data update for the data analytics job into the first resilient distributed dataset; or a fifth cost of transforming one or more documents in the distributed document storage database to the first resilient distributed dataset.

14. The apparatus of claim 11, wherein the second cost further comprises one or more of: a sixth cost of at least one input/output operation at the distributed document storage database attributable to newly creating the second resilient distributed dataset for the data analytics job; a seventh cost of at least one network input/output operation from the distributed document storage database attributable to newly creating the second resilient distributed dataset for the data analytics job; or an eighth cost of transforming one or more documents in the distributed document storage database to the second resilient distributed dataset.

15. The apparatus of claim 11, further configured for performing the merging by:

obtaining a first set of documents from the distributed document storage database, wherein each document in the first set of documents has been either deleted or updated; and applying a filter operation to an existing resilient distributed dataset for the distributed document storage database to filter out all of the deleted and updated documents to generate a first new resilient distributed dataset.

16. The apparatus of claim 15, further configured for performing the merging by:

obtaining a second set of documents from the distributed document storage database wherein each of the documents in the second set of documents has been either updated or created;

generating a second new resilient distributed dataset for the second set of documents; and applying a union transformation to combine the first new resilient distributed dataset with the second resilient distributed dataset to produce a newly updated resilient distributed dataset that includes merged data updates.

* * * * *